United States Patent
Mondello et al.

(10) Patent No.: US 12,235,371 B2
(45) Date of Patent: Feb. 25, 2025

(54) MOVING SPACE BASED DATUM SYSTEM AND METHODS OF USE

(71) Applicant: TOMORROW'S PIXELS, LLC, Irmo, SC (US)

(72) Inventors: Joan Mondello, Irmo, SC (US); Charles Mondello, Irmo, SC (US)

(73) Assignee: TOMORROW'S PIXELS, LLC, Irmo, SC (US)

(*) Notice: Subject to any disclaimer, the term of this patent is extended or adjusted under 35 U.S.C. 154(b) by 0 days.

(21) Appl. No.: 18/196,204

(22) Filed: May 11, 2023

(65) Prior Publication Data

US 2023/0366970 A1    Nov. 16, 2023

Related U.S. Application Data

(60) Provisional application No. 63/473,232, filed on May 12, 2022.

(51) Int. Cl.
*G01S 5/00*    (2006.01)

(52) U.S. Cl.
CPC ............ *G01S 5/0027* (2013.01); *G01S 5/009* (2013.01)

(58) Field of Classification Search
CPC .... G01C 21/02; G01C 21/3807; G01C 15/00; G01S 5/0027; G01S 5/009; G01S 5/0289; H04W 84/18
See application file for complete search history.

(56) References Cited

U.S. PATENT DOCUMENTS

| | | | |
|---|---|---|---|
| 4,761,652 | A | 8/1988 | Pirolli et al. |
| 5,812,961 | A | 9/1998 | Enge et al. |
| 8,797,206 | B2 | 8/2014 | Uysal et al. |
| 8,884,954 | B2 | 11/2014 | Michopoulos et al. |
| 10,420,510 | B2 | 9/2019 | Lai |
| 2004/0203380 | A1* | 10/2004 | Hamdi ............. G01S 5/0289 455/456.1 |
| 2009/0171583 | A1 | 7/2009 | DiEsposti |
| 2013/0332072 | A1 | 12/2013 | Janky et al. |
| 2014/0300941 | A1 | 10/2014 | Chang et al. |
| 2022/0011446 | A1 | 1/2022 | Segal et al. |
| 2022/0026877 | A1 | 1/2022 | Small et al. |

FOREIGN PATENT DOCUMENTS

| | | |
|---|---|---|
| CN | 106961363 | 7/2017 |
| CN | 108387246 | 8/2018 |
| CN | 109959333 | 7/2019 |

OTHER PUBLICATIONS

Quality Engineering and Survey Technology Ltd, Introduction to GPS, 31 pages (Year: 1996).*
P.-C. Chen, A Non-Line-of-Sight Error Mitigation Algorithm in Location Estimation, IEEE Wireless Communications and Networking Conference, p. 316-320 (Year: 1999).*

(Continued)

*Primary Examiner* — Bernarr E Gregory
*Assistant Examiner* — Fred H Mull
(74) *Attorney, Agent, or Firm* — Maynard Nexsen PC; Todd A. Serbin

(57) ABSTRACT

A moving space based datum (MSBD) formed from a plurality of nodes in space which designate at least one data reference line or plane.

23 Claims, 13 Drawing Sheets

(56) References Cited

OTHER PUBLICATIONS

S. Capkun et al., GPS-free positioning in mobile Ad-Hoc networks, Proceedings of the 34th Hawaii International Conference on System Sciences, p. 1-10 (Year: 2001).*
Datum. (2001). In Hargrave's Communications Dictionary, Wiley (1st ed.). Wiley. https://search.credoreference.com/articles/Qm9va0FydGljbGU6MTQ2NDAwMw== (Year: 2001).*
J. Agre et al., A Layered Architecture for Location-based Services in Wireless Ad Hoc Networks, Proceedings of the IEEE Aerospace Conference, p. 3-1085 to 3-1097 (Year: 2002).*
A. Savvides et al., The Bits and Flops of the N-hop Multilateration Primitive for Node Localization Problems, WSNA'02, 10 pages (Year: 2002).*
Distance1. In the Penguin English Dictionary (3rd ed.). Penguin. https://search.credoreference.com/articles/Qm9va0FydGljbGU6MjlwODU3MA== (Year: 2007).*
Z. Chang et al., Cross-Layer Designs Architecture for LEO Satellite Ad Hoc Network, WWIC 2008, LNCS 5031, p. 164-176 (Year: 2008).*
Datum. In the American Heritage Dictionary of the English Language (6th ed.). Houghton Mifflin. https://search.credoreference.com/articles/Qm9va0FydGljbGU6NDQwMzc0Ng== (Year: 2016).*
G.V. Smirnov et al., Tetrahedron formation of nanosatellites with single-input control, Astrophys Space Sci, vol. 363(180), p. 1-8 (Year: 2018).*
Lockheed Martin, Lockheed Martin to Build 10 Small Satellite Mesh Network in Two Years, https://news.lockheedmartin.com/news-releases?item=128968, 3 pages (Year: 2020).*

\* cited by examiner

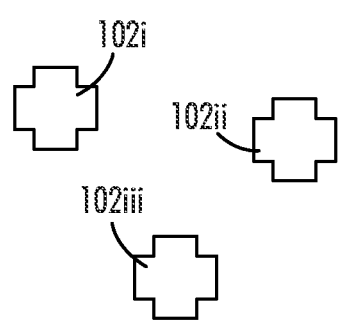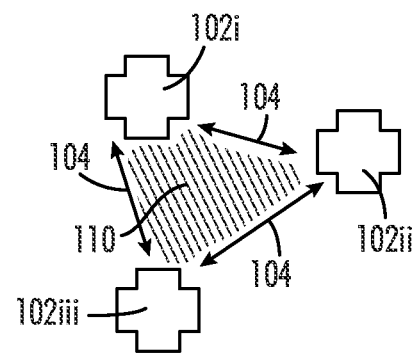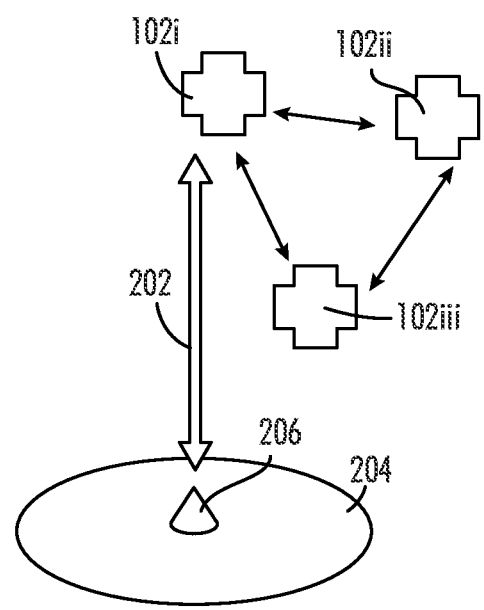

MOVING SPACE BASED DATUM SYSTEM AND METHODS OF USE

RELATED APPLICATION

This application claims the benefit of priority under 35 USC § 119 (e) of U.S. Provisional Patent Application No. 63/473,232 filed on May 12, 2022, and is filed concurrently with a corresponding, related PCT application of the same title, the contents of which are incorporated herein by reference in their entireties.

FIELD OF THE INVENTION

The present invention, in some embodiments thereof, relates to object referencing and, more particularly, but not exclusively, to a space based reference datum system.

BACKGROUND OF THE INVENTION

A geodetic datum or geodetic system (also: geodetic reference datum, geodetic reference system, or geodetic reference frame) is a global datum reference or reference frame for precisely representing the position of locations on Earth or other planetary bodies by means of geodetic coordinates. Datums are relevant to any technology or technique based on spatial location, including geodesy, navigation, surveying, geographic information systems, remote sensing, and cartography. A horizontal datum is used to measure a location across the Earth's surface, in latitude and longitude or another coordinate system; a vertical datum is used to measure the elevation or depth relative to a standard origin, such as mean sea level (MSL).

There have historically been a series of mapping methods to delineate a surface model of an object. In the geospatial sector, maps of objects are georeferenced in a multitude of ways using ellipsoid models and the layering of different geospatial data set types. The main point of reference is often against surfaces which can be seen, surveyed and or mathematically modeled against another surface or datum.

The locations of the satellites are conventionally determined using tracking from ground stations. The ground stations use mechanisms such as radar, signal doppler, and laser reflectors to pinpoint the position of a satellite and to maintain an understanding of its orbital elements.

Given valid Keplerian orbital elements, it is basic orbital mechanics to calculate where the satellite is at a specific point in time. The Keplerian elements are:

Epoch Time—the time at which the other seven values are defined;
i—Inclination (degrees)—the angle between the equator and the orbit plane;
e—Eccentricity—a constant defining the shape of the orbit (0=circular, <1=elliptical);
a—Semi-major Axis (meters)—a constant defining the size of the orbit;
v—True Anomaly (degrees)—the angle between perigee and the vehicle (in the orbit plane);
Ω—Right Ascension of the Ascending Node (degrees)—the angle between vernal equinox and the point where the orbit crosses the equatorial plane (going north);
ω—Argument of Perigee (degrees)—the angle between the ascending node and the orbit's point of closest approach to the earth (perigee).

All of this information is compiled into a table called the ephemeris. This data is further complemented by a satellite's onboard positioning, utilizing a multitude of vehicle-based systems.

Since the rise of the global positioning system (GPS), the ellipsoid and datum World Geodetic System (WGS) 84 it uses have supplanted most others in many applications. The WGS 84 is intended for global use, unlike most earlier datums.

Previous attempts for providing datums or three-dimensional positioning systems in other market sectors include US Pat. App. Pub. No. 2014/0300941, entitled "Method and apparatus for generating hologram based on multi-view image."

Additional background art includes: U.S. Pat. No. 10,420,510, entitled "System and method for imaging a moving subject"; US Pat. App. Pub. No. 2022/0026877, entitled "Outer space digital logistics system"; CN Pat. App. Pub. No. 106961363, entitled "A kind of method and system for capturing virtual switch User space data plane data message"; U.S. Pat. No. 8,884,954, entitled "Algorithm and a method for characterizing surfaces with fractal nature"; U.S. Pat. No. 5,812,961, entitled "Method and receiver using a low earth orbiting satellite signal to augment the global positioning system"; U.S. Pat. No. 8,797,206, entitled "Method and apparatus for simultaneous multi-mode processing performing target detection and tracking using along track interferometry (ATI) and space-time adaptive processing (STAP)"; U.S. Pat. No. 4,761,652, entitled "Arrangement for measuring the distance separating the arrangement from a moving body"; CN Pat. No. 108387246, entitled "Multinode distribution space-time datum method and apparatus"; and, CN Pat. No. 109959333, entitled "Spatial accuracy bearing calibration and equipment".

However, none of the above cited publications solve the technical problems still confronted by the art and addressed by embodiments of the invention described herein.

SUMMARY OF THE INVENTION

According to an aspect of some embodiments of the present invention there is provided a moving space based datum (MSBD) formed from a plurality of nodes in space which designate at least one data reference line or plane.

According to an aspect of some embodiments of the present invention there is provided method of using an MSBD formed from a plurality of nodes in space which designate at least one data reference line or plane, comprising: gathering a known location of the plurality of nodes in space; forming a MSBD comprising a tessellated surface by using the plurality of nodes to designate at least one reference line or plane as the MSBD; and, calculating the relationship between the MSBD and an object at a specific distance in time.

In an embodiment of the invention, the method further comprises using the MSBD to calculate at least one of the position and orientation of at least one of the nodes that make up the MSBD.

In an embodiment of the invention, the method further comprises using the MSBD to calculate at least one of the position and orientation of the object, wherein the object is external to the MSBD.

In an embodiment of the invention, the method further comprises using the MSBD to ascertain at least one of ground and planetary position of the object.

In an embodiment of the invention, the method further comprises calculating at least one of position and orientation of a passing object.

In an embodiment of the invention, the plurality of nodes are made up of at least one of a temporal point and a physical point.

In an embodiment of the invention, the method further comprises communicating data between the plurality of nodes.

In an embodiment of the invention, the method further comprises communicating data between one or more of the plurality of nodes and at least one ground station.

In an embodiment of the invention, the method further comprises weighting at least one of the nodes for at least one of performance calculations and modeling.

In an embodiment of the invention, the weighting is temporal weighting.

In an embodiment of the invention, the method further comprises a creating a plurality of subsets of nodes.

In an embodiment of the invention, individual nodes that comprise the MSBD change over time.

In an embodiment of the invention, the method further comprises correcting error related to a node of the MSBD by sharing at least one of position data and orientation data amongst the plurality of nodes of the MSBD.

In an embodiment of the invention, a node is selected from a weather satellite, a space telescope, an imaging satellite, a communications satellite, the international space station or other space based entity.

In an embodiment of the invention, designation of a MSBD is independent of the type of nodes used.

In an embodiment of the invention, the MSBD is designated using calculations based on at least one of past, present and future predicted node locations.

In an embodiment of the invention, at least one of the nodes is at least partially simulated.

According to an aspect of some embodiments of the present invention there is provided a method of ascertaining a geolocation of at least one point on a ground, comprising: connecting an MSBD formed from a plurality of nodes in space which designate at least one data reference line or plane to a ground station in a known geolocation, to establish a referenced relationship between the MSBD and the known geolocation; and, connecting at least one of the nodes of the MSBD to the at least one point on the ground, the geolocation of the at least one point to be determined; and, calculating the geolocation of the at least one point on the ground using the referenced relationship.

In an embodiment of the invention, connecting the nodes within the MSBD is performed continually or temporally.

According to an aspect of some embodiments of the present invention there is provided a method of ascertaining a geolocation of at least one point on a ground, comprising: gathering at least one of position, navigation and timing data from at least one node of an MSBD formed from a plurality of nodes in space which designate at least one data reference line or plane to acquire a tessellated surface reference position in space; associating at least one of surface placement and position accuracy to the at least one of the MSBD; translating the position of the referenced MSBD to the at least one point on the ground; and, determining a geolocation of the at least one point by triangulation using three or more nodes of the MSBD.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example, are not necessarily to scale and are for purposes of illustrative discussion of embodiments of the invention. In this regard, the description taken with the drawings makes apparent to those skilled in the art how embodiments of the invention may be practiced.

In the drawings:

FIGS. 2A-2C are schematic diagrams showing various aspects of a MSBD system, in accordance with some embodiments of the invention;

DESCRIPTION OF SPECIFIC EMBODIMENTS OF THE INVENTION

Figure 1:
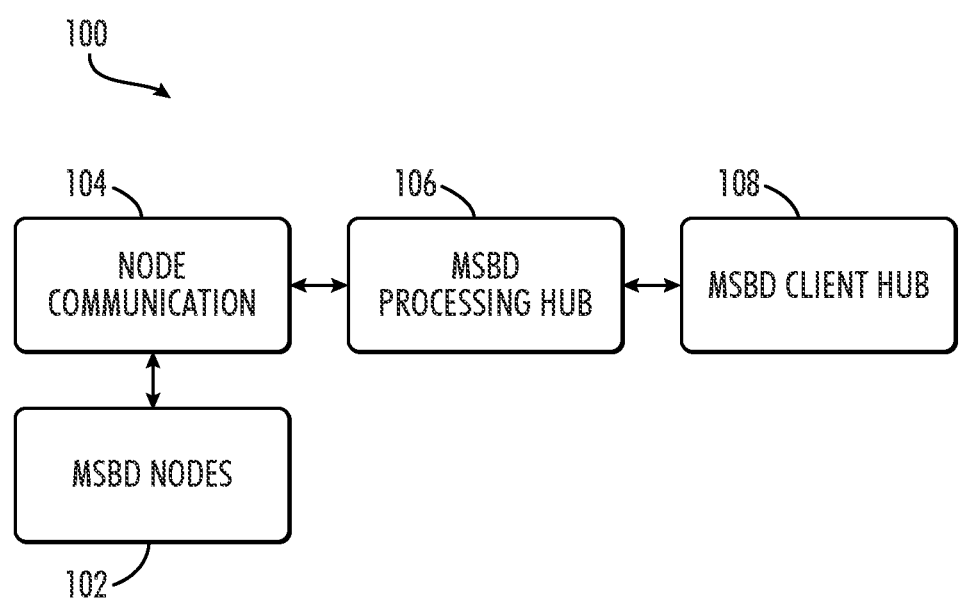
FIG. 1 is a block diagram of a Moving Space Based Datum (MSBD) system, in accordance with some embodiments of the invention.

The present invention, in some embodiments thereof, relates to object referencing and, more particularly, but not exclusively, to a space based reference datum system.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Generally, any type of mapping requires that a datum is a plane, a straight line, or a point that is used as a reference when measuring the location and/or dimensions of a target. What has not existed is a space based datum, given its challenge that measurable reference points could not be defined in the emptiness of sky and space. A datum must provide a surface from which measurement may be derived. There is an increased need for space mission support that requires positional & orientation accuracy, in part due to: a) the proliferation of space based objects; b) the need for space debris tracking & removal, in-orbit refueling, tasking, collision avoidance; and c) a need for alternatives for earth geolocation (i.e. alternatives to GPS or GNSS).

Given a space based pool of satellites and/or air and/or space based manned and/or unmanned platforms and/or space based vehicles (any, some or all also referred to as "nodes" herein and all of these terms being used interchangeably throughout), each with positional awareness independent and relative to each other, the invention described herein defines a highly accurate moving space based datum system ("MSBD system"), using these space based objects' dynamically updating coordinates. This connected network of satellites or space based entities, provides a scalable space based moving datum, a reference plane with associated functionality of a virtual surface from which measurements can be made. A satellite (or space based entity) may act as a single point contributor or as a hub that communicates with the plurality of satellites.

It should be understood that MSBD implementation is independent of the type of nodes used. For example, a node in the MSBD system can be a weather satellite, a space telescope, an imaging satellite, a communications satellite, the international space station or other space based entity. This is a non-exhaustive list provided for illustrative purposes only.

These satellites are points within the virtual moving datum ("MSBD plane" or just "MSBD"). While moving; their past, current, and even future motions are measured and calculated upon. This provides a past, current and planned future surface for the moving datum. This awareness provides for temporal calculations and enhancements to be performed on the moving space based datum. Nodes may enter or exit the system temporally. Even when out of the network, nodes may be modeled for inclusion or removal. All of the nodes may be utilized to model the MSBD or a subset only of those in the meshed network. The MSBD may be represented by a meshed and/or tessellated surface(s).

In an embodiment of the invention, points in the MSBD are in motion but always define a well-known surface plane (the MSBD). The MSBD may be comprised of a series of points, lines, or planes, which may form the MSBD tessellated and or meshed surface. Objects, such as satellites or space based entities (used interchangeably), that exist in the MSBD are a source of data for creation of the MSBD.

According to some embodiments of the invention, this MSBD plane is characterized at any instant in time and is available as a global or planetary reference source. It is independent of any one or even a series of reference space based objects, as objects enter and leave the MSBD plane dynamically. In an embodiment of the invention, the MSBD plane is formed by a tessellated surface where the nodes represent actual or predicted satellite locations.

Figure 3:
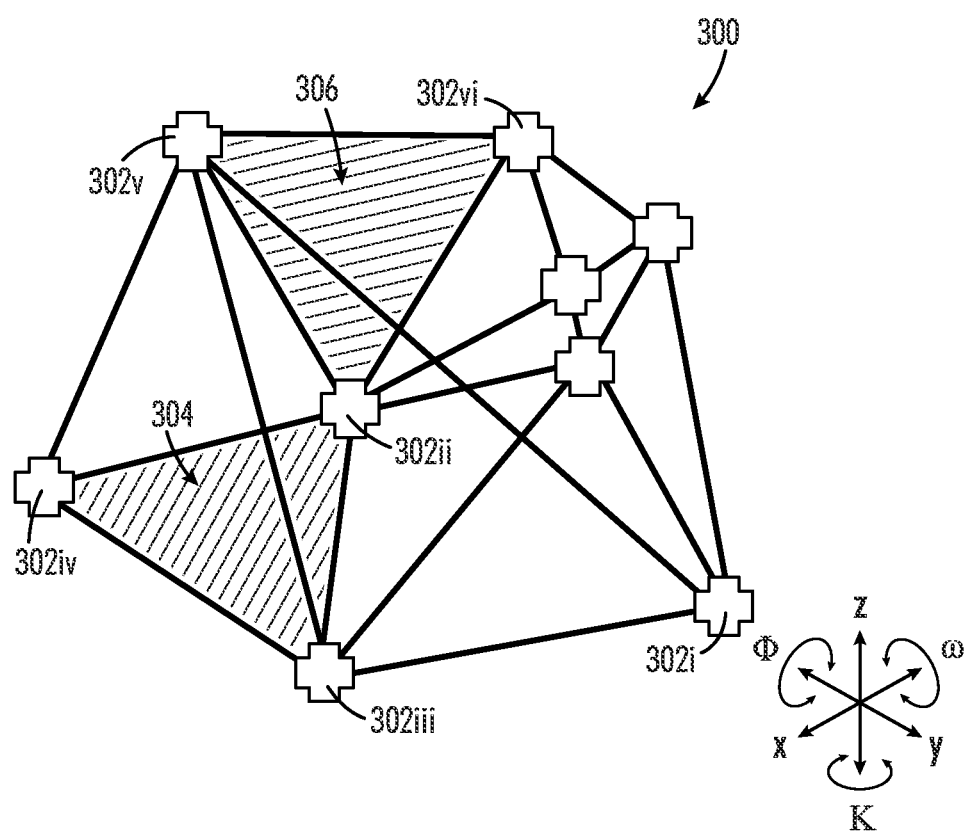
FIG. 3 is a schematic diagram showing position and orientation accuracy aspects of the MSBD system, in accordance with some embodiments of the invention.

Through the use of a plurality of satellites (2, 3 or more), such as described herein, a geo-referenced or space based referenced datum and surface plane is formed, for example as shown in FIGS. 2A-2C. The plane is formed by at least one tessellated surface 304, such as shown in FIG. 3 (a second tessellated surface 306 also shown), where the nodes represent actual and/or predicted satellite locations. This plane provides a surface from which a multitude of calculations and services may be performed augmenting conventional position orientation methods and other client satellite systems continually or temporarily linked to the tessellated or meshed network.

As an example, with the advent of new communication services, satellites in low to medium earth orbit, as well as synchronous and geostationary satellites offer a network of georeferenced points in space connected into a highly accurate live data plane. These points may interconnect through a plurality of lines of sight continuously or at any instant in time, such as shown and described with respect to FIG. 7, inter alia. Satellites reference their location through many methods. This may include celestial body or star tracking, onboard GPS, ground RF range finding, or finally laser ground site range finding and orientation. Conventionally, these location reference methods are independent and unique to each individual satellite, but as described herein, this operational uniqueness is not a barrier in MSBD implementation.

As is described below with respect to FIG. 3, inter alia, the present invention integrates across nodes, achieving higher accuracies by correlation across disparate nodes, each having a fundamental awareness of position and orientation.

The network or space based datum as a whole, benefits from the continued addition of new uncorrelated data sets such as additional satellites or space based entities, across the network, described in more detail below with respect to FIG. 10, inter alia.

In these and other methods of the invention, the reference plane gains accuracy from multiple disparate reference sources, removing the errors within a single satellite of interest at a single point in time, described in more detail below with respect to FIG. 11, inter alia.

Referring now to the drawings, FIG. 1 is a block diagram of a Moving Space Based Datum (MSBD) system 100, in accordance with some embodiments of the invention. The MSBD system 100 utilizes space based data points or nodes 102 (i.e. satellites and/or other space based objects) placed in interconnected communication 104, to form an orbiting network that constructs a space based, continually updating datum or reference plane. This MSBD reference plane can then be used as a GPS independent positioning, navigation, and timing (PNT) reference plane, referred to herein as a moving space based datum. Not only is this an alternative to GPS but also a PNT enhancement for nodes and ground systems connected to the MSBD system 100.

The MSBD system 100 can incorporate many individual nodes 102. Each node can act as a user, beneficiary or both within the MSBD system 100, providing data or receiving data to create the surface and or enhancing their own locational orientation awareness. The data used will be maintained in one or more MSBD Client Hubs 108, in some embodiments of the invention. These Hubs 108 may be ground or space-based or a combination of both location in which MSBD calculations are performed and archived. The calculations and archive may represent a single node, a series of nodes or the MSBD as a whole. This is also considered temporally as any of the cases can be at an instant in time or over a period of time: past, present, or future. Hub(s) 108 will not only provide one or more nodes a unique archive but can also act as a processor, to process data temporally. This temporally processed data can be used to provide enhancement prediction, calibrations, system planning, system parameters and system enhancements, in an embodiment of the invention. In an embodiment of the invention, data will be archived at the MSBD Client Hub 108 for extraction, as required, based on the use case.

Nodes 102 in the MSBD constitute both natural and manmade objects, in some embodiments of the invention. In some embodiments of the invention, manmade objects can use natural objects as source of calibration in their position orientation solutions, for example the moon or a known point on the moon. Natural objects may also exist in the MSBD as a reference point or calibration source for the MSBD or subset of MSBD versus singular nodes of the MSBD.

As described above, datums are crucial to any technology based on spatial location, including geodesy, navigation, surveying, geographic information systems, remote sensing, and cartography. A datum provides a surface from which measurement may be derived. These measurements now obtained through the MSBD can be performed against the virtual backdrop of sky and space.

Satellites reference their location through many methods. These location methods may include celestial body or star tracking, onboard GPS, ground RF range finding, or finally laser ground site range finding and orientation. To date, these methods are independent and unique to each individual satellite, reducing any error correlations internal to its data but within its own single, independent satellite. It is conceived by embodiments of the invention that the MSBD shall integrate across nodes 102 achieving higher accuracies by correlation across disparate satellites or vehicles each having a fundamental awareness of position and orientation. (Note: The terms "satellite", "space based entity" and "vehicle" are interchangeable and all represent "nodes" 102 in the MSBD system 100. And the term "moving space based datum" (MSBD) is used interchangeably with "space based moving datum".

The network or space based datum as a whole, benefits from the continued addition of new uncorrelated data sets such as additional satellites or space based entities, across the network. The grid of the network acts as a positional surface plane (MSBD) for services that can use point to point or multiple locations for target triangulation.

In some of the methods described herein, the reference plane gains accuracy from multiple disparate reference sources, removing the errors within a single satellite 102 of interest at a single point in time, described in more detail below with respect to FIG. 11, inter alia. As a satellite 102 moves in a known and or predicted trajectory, its data may also be processed temporally, for example by at least one MSBD processing hub 106 (located on the ground or in space), in forward and reverse direction to further enhance the positional and orientation awareness, which is analogous to a Kalman filtering. The MSBD hub can perform a multitude of tasks. These include but are not limited to node: positional information, usage data, ownership, operational parameters, performance, corrections and other vehicle parameters. The MSBD hub can also perform MSBD calculations on the whole or subset of tessellated surfaces within the MSBD, such as positioning, orientation, error prediction and reduction, and temporal assessments. The MSBD hub can further act as the dissemination point for the tessellated mesh surface datum. It has the ability to forward correction data to individual nodes.

The terrestrial world has now seen and enjoyed the benefits of an interconnected distributed data architecture that is planetary based (i.e. a ground based mesh network). In view of the inventive embodiments described herein, the space domain may now benefit from this same type of interconnected georeference and pointing network plane. Rigorous positional awareness across the MSBD system 100 will enhance not just each satellite's 102 independent positioning but will further the "tipping and queuing" tasking/positioning accuracy across vehicles for a diversity of tasks. In an embodiment of the invention, the frequency of positional updates from nodes 102 in the MSBD system 100 is comparable with the GPS clock. An advantage of this frequency of positional updates is that satellite velocity and orbital changes do not substantially impact, or not at all, the efficacy and/or operation of the MSBD system 100.

Satellites in space have many common features. They have power, positioning, communication, imaging, data processing, storage, self-preservation capabilities and more. One aspect that is limited is their ability to interconnect to share benefits amongst each other. This sharing may mitigate a single node 102 failure or augment capability in positioning, processing, attitude, power or more. To date, space systems have enabled interconnection for communication to real time downlink but this is only the tip of what may be considered. Now through the MSBD system 100, cross platform, meshed PNT and Pointing & Positioning (P&P) are added in combination. To date, many industry solutions in this trade space revolve around the transmission of data from ancillary satellite vehicles through the communication network. However, in some embodiments of the invention, new functionality is provided to the meshed network by adding the notion of a series of added functions now made available through the interconnected network of satellite vehicles or space based entities.

As is described herein, the MSBD system 100 is a novel approach to PNT, that brings with it GPS independence, as it can use any satellite that has a tracking methodology (e.g. star trackers). The MSBD system 100 takes advantage of a satellite's capability for its own positional awareness. The accuracy of the MSBD system 100 increases as the number of nodes within the MSBD system 100 increases. However, as more sensors are added to each node, the MSBD system 100 sees further improvements. This is embodied in example by a single node adding additional star tracking capability, giving that node a higher degree of performance in position and orientation. System 100 accuracy improves with added non-PNT nodes (any vehicle type improves MSBD), whereas GPS would generally require added GPS vehicles. The MSBD system 100 brings reliability to positional awareness as nodes 102 can be added, substituted, or even removed from the MSBD system 100 dynamically. In some embodiments, the MSBD system 100 has planetary (e.g. Earth, Moon, Mars, Titan . . . ) applicability wherein a node 102 can determine its position (via any method), and wherein multiple nodes 102 can form the MSBD and wherein these nodes 102 can be located anywhere in a celestial plane. This enables benefit for non-earth centric platforms and constellations. The MSBD system 100 implementation is inclusive for all types of satellite location and orientation methodologies, making it satellite platform implementation independent.

Embodiments of the present inventions merge non-GPS based space based P&P awareness, combined with mesh network processing, forming a PNT alternative to enhance or replace current PNT systems, or to provide PNT service in GPS-denied environments. In an embodiment of the invention, the MSBD system 100 uses the mesh network's processing of temporally captured P&P data from satellites or space-based entities 102 in the network to form a MSBD plane of the MSBD system 100.

FIGS. 2A-2C are schematic diagrams showing various aspects of a MSBD system 100, in accordance with some embodiments of the invention. FIG. 2A shows three nodes 102i, 102ii, 102iii in space which two or more of which could form a MSBD plane 110 of the MSBD system 100.

FIG. 2B illustrates that these nodes 102i, 102ii, 102iii interlink with communication 104 between them via at least a data stream. It should be understood that the communication 104 lines are drawn between only the three nodes 102i, 102ii, 102iii, in other formations of the MSBD there could be any number of additional nodes with which communication can be had, in virtually any combination and/or configuration, see for example the different node configurations shown in FIGS. 4 and 6.

FIG. 2C illustrates ground communication 202 with at least one ground station 206 located on a ground surface 204, in accordance with an exemplary embodiment of the invention. It should be understood that the use of the word "ground' is not limited to the earth's surface, but can include any other surface, such as the Moon or Mars, or any other location that a ground station 206 could be located. In some embodiments of the invention, the ground station 206 conducts processing and/or control of the MSBD system, for example operating as the MSBD processing hub 106. Optionally, more than one ground station 206 exists in the MSBD system 100, with tasks divided between the plurality of ground stations in an additional and/or alternative configuration. For example, one ground station 206 could merely be redundant to another, or as another example, two ground stations 206 divide tasks between them such as by communicating with different sets of nodes 102 in the MSBD system 100, respectively.

In an embodiment of the invention, communication occurs between the plurality of nodes 102 and the ground station 206 where the ground station 206 performs tracking, processing, coordination, error correction, prediction and the like with each node individually. In some embodiments of the invention, the plurality of nodes perform these tasks amongst each other (e.g. as a mesh network forming a hub) and communicate with the ground station 206 as a collective. Optionally, it is a combination of these two paradigms. In an embodiment of the invention, communication and data related to formation and/or operation of the MSBD system 100 is transmitted as a packet attached to ephemeris data which is already being communicated to/by the nodes 102 and/or or is easily integrated into telemetry or other data stream with little impact to conventional node operations.

FIG. 3 is a schematic diagram showing position and orientation accuracy aspects of an MSBD 300 of the MSBD system 100, in accordance with some embodiments of the invention. In some embodiments of the invention, the MSBD system 100 effectuates a positioning and orientation augmentation superior to what is achieved with an individual satellite/node alone. By aggregation of multiple nodes at different positions and orientations, the system 100 enhances position and orientation for the entire MSBD 300 of continually or partially connected nodes. Each node in the network can have star tracking, global positioning and/or similar positioning systems. Each system has a unique position and orientation with internal errors based on their unique technologies. As position and orientation calculations are made at each unique node, the local errors are removed by comparing each node's location across the MSBD 300.

As the data is shared among nodes, these disparate errors may be removed enhancing each node's position and orientation knowledge. For example a series of interconnected linked nodes, such as shown in MSBD 300, will share position and orientation information and act as a series of nodes from which a reference plane may be calculated. Added nodes/vehicles continually improve the overall system 100 performance. As a node degrades in individual performance, its capabilities of position and orientation awareness can be enhanced through the mesh of satellites, in an embodiment of the invention. This may be done instantaneously or over time as new vehicles leave and enter the MSBD 300.

More specifically, in an embodiment of the invention, a node (e.g. nodes 302i . . . 302vi . . . 302n) as a component data set of the MSBD 300 has its location, distance and positional (x,y,z) awareness enhanced by being a member of the MSBD (which comprises a plurality of nodes each with some or all of such data). Each node 302i . . . vi has an associated x,y,z position in space. For three-dimensional systems, a convention is to portray the xy-plane, with the z-axis added to represent an axis perpendicular to the xy-plane. Each node 302i . . . vi also has an associated Roll Omega ($\omega$), Pitch Phi ($\phi$) and Yaw Kappa ($\kappa$). These x,y,z, $\omega$, $\phi$,$\kappa$ axes are shown in FIG. 3 for node 302i.

For each node, their accuracy is based on each device's unique performance/data characteristics. The variation and accuracy of position and orientation from one node to another will reflect an error associated with each node that, in turn, may be calculated and removed to enhance the position orientation of each node and the overall meshed surface calculation of the MSBD. That shared data may be used to correct each node's location and/or pointing errors.

In an embodiment of the invention, as a node's position is enhanced, added error artifacts due to orientation may be resolved via assessment of pointing errors toward other nodes within the MSBD. The removal of these errors may be repeated temporally to characterize the individual nodes orientation performances and any systems errors such as backlash.

Additionally, it is conceived that the sharing of positional data can be used as an independent calibration source for a client's system as an additional service or feature of the MSBD system 100.

The MSBD is independent of GPS, although GPS may be used if available. The mesh may be calculated from the nodes' temporal track, stellar solutions of position, and orientation alone.

Figure 4:
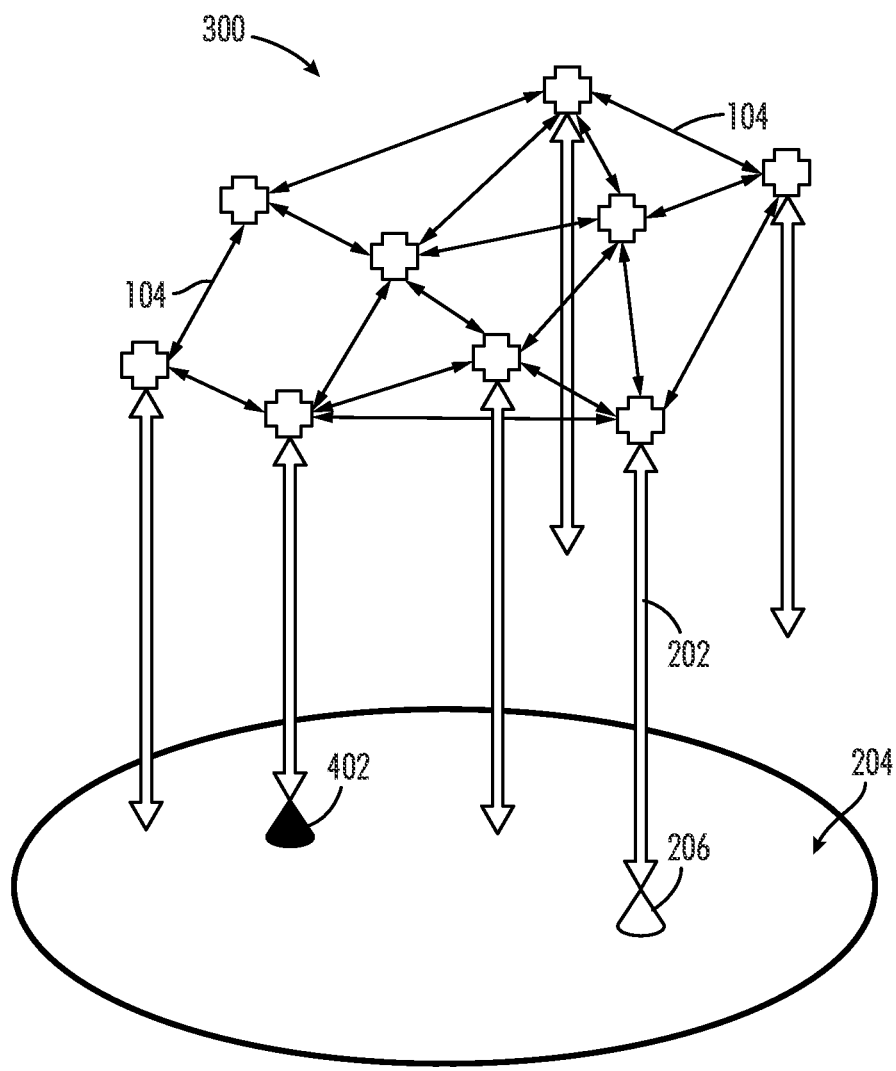
FIG. 4 is a schematic diagram showing use of the MSBD system for ground surface mapping, in accordance with some embodiments of the invention.

FIG. 4 is a schematic diagram showing use of the MSBD system 100 for ground surface mapping, in accordance with some embodiments of the invention. In an embodiment of the invention, by connecting the MSBD 300 to the ground 204 either continually or temporally over a single point, or finally over multiple points, ground positioning knowledge is gained for a ground based object 402 from the MSBD 300. As a multitude of nodes exist within the MSBD mesh, no one node is required for a positional assessment of a point on the ground or for another node's positional enhancement in space. The diversity of nodes within the mesh enables selection of a series of optimal nodes for location reference and triangulation transfer to a ground point. As the mesh further has layers of nodes the density of points for triangulation will have additional redundancies by the stacking of meshed data planes. The knowledge of the position of the MSBD relative to the ground enables the calculations to be made to determine the location of a point on the ground. As described elsewhere herein, the term "ground" is not limited to the earth, but can include lunar, stellar or planetary ground surfaces.

Figure 5:
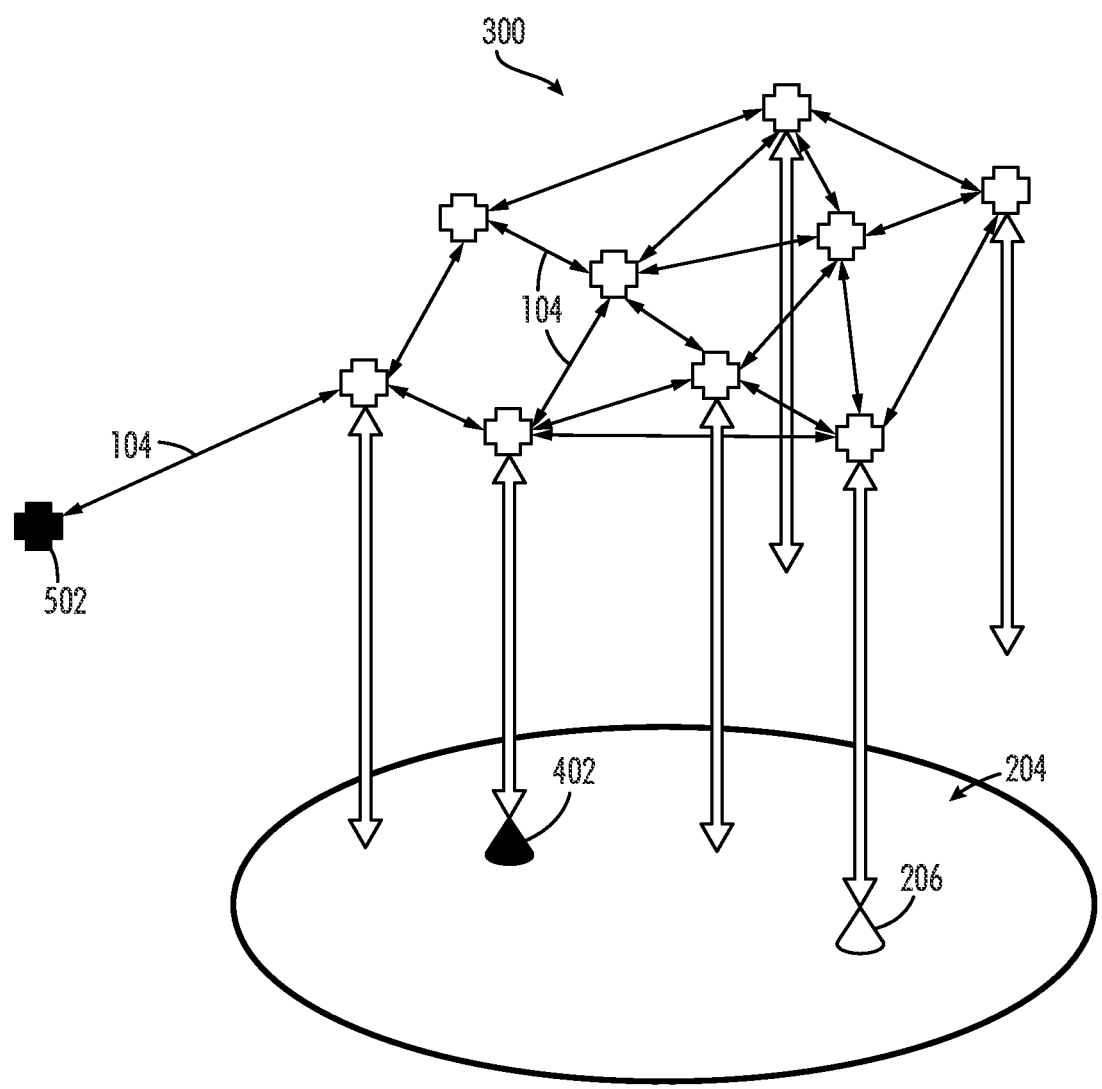
FIG. 5 is a schematic diagram showing use of the MSBD system for acquiring position and orientation information for a passing object, in accordance with some embodiments of the invention.

FIG. 5 is a schematic diagram showing use of the MSBD system 100 for acquiring position and orientation information for a passing object 502 (not a part of the MSBD), in accordance with some embodiments of the invention. By connecting the MSBD 300 to another passing object 502 (e.g. satellite or space based entity), either continually, temporally over a single point, or finally over multiple points, a positional reference for that satellite or space based entity can be gleaned from the MSBD. FIG. 5 shows the MSBD 300 with a passing object 502, or "client node".

While the positional and orientation information, and other information, is known from nodes integrated into the MSBD 300, the information of a passing object 502 which passes into and/or out of the area near the MSBD 300 is not necessarily known beforehand. However, by applying the known data accumulated by the MSBD system 100 in relation to the passing object 502, at the very minimum, position and/or orientation and/or other data (e.g. velocity) can be ascertained for the passing object 502. The client node is a node that utilizes the knowledge of the MSBD, however in some embodiments of the invention, it is not a formal member of the MSBD but rather a temporary member. One such scenario would be that the owner of the client node (e.g. satellite) pays a fee to the owner of the MSBD for services rendered to them by the MSBD as the client node passes by/through/near the MSBD. These services could include but are not limited to enhanced positional or orientation or velocity data enhancement and planning.

Figure 6:
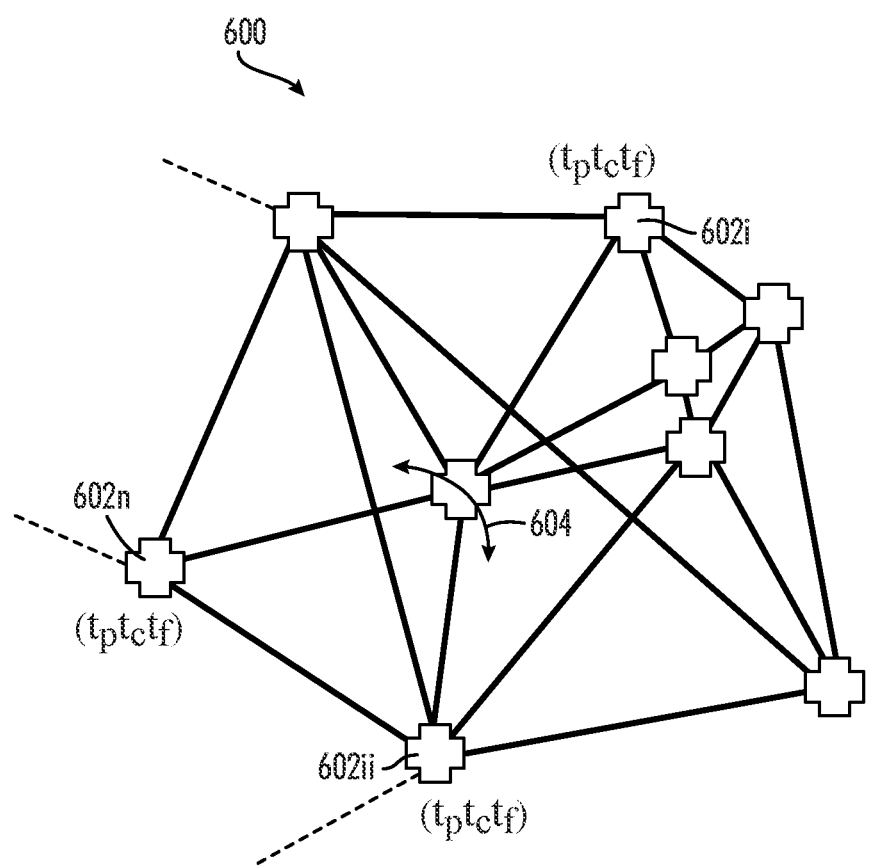
FIG. 6 is a schematic diagram showing time-based interpolation and performance smoothing, in accordance with some embodiments of the invention.

FIG. 6 is a schematic diagram showing time-based interpolation and performance smoothing in an MSBD 600, in accordance with some embodiments of the invention. In an embodiment of the invention, the MSBD 600 may be made up of temporal or physical points 602i, 602ii, 602n. From each node's position orientation data 604, modeling can be performed via one of many techniques represented by, but not limited to, a calculated Kalman like filter past, current, and future ($t_p$, $t_c$, $t_f$) temporally. This will permit interpolations and performance smoothing, if required, for enhancements in the MSBD 600. By use of this or similar interpolations, instantaneous assessments of any node or group of nodes can be compared at an instant in time. This in turn can provide assessments of individual nodes position orientation errors relative to the full or regional MSBD mesh. Corrections can then be applied to nodes as required.

In some embodiments of the invention, such modeling is also used for the mesh of the MSBD 600, for each individual node, as well as regional and MSBD as a whole calculations. Given the continual motion of nodes within the partial or full mesh of the MSBD 600, the surface modeling lends itself to a predictive artificial intelligence (AI) architecture in which past, current and future positions may be predictively modeled AI, including tessellated computational fluid dynamics (TCFD), machine learning, deep learning, and reinforcement learning. The operational nature of a satellite lends itself to the predictability of their position at any moment in time, past, present and future. The use of this information in the creation of a predictive model of the MSBD aligns with the characteristics of AI computations.

In some embodiments of the invention and as described elsewhere herein, the MSBD 600 can be implemented mathematically using the knowledge of three space based nodes. However, those three nodes can be three locations for a space based entity over the course of time from a single entity, including any combination of a node's past, present or future locations, in accordance with an exemplary embodiment of the invention.

Figure 7:
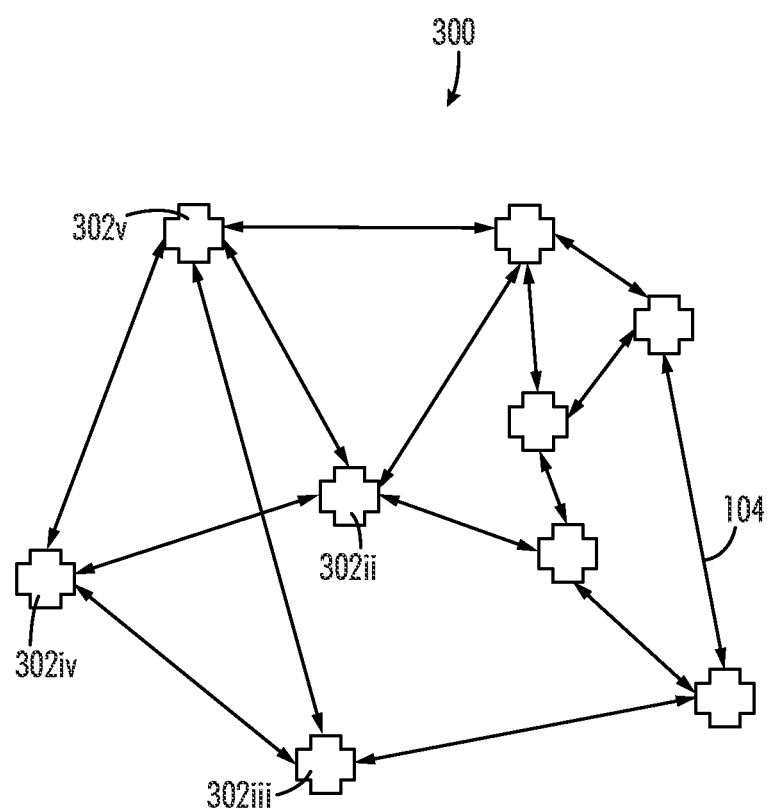
FIG. 7 is a schematic diagram showing bidirectional communication capabilities between nodes of the MSBD system, in accordance with some embodiments of the invention.

FIG. 7 is a schematic diagram showing bidirectional communication capabilities between nodes of the MSBD 300 in the MSBD system 100, in accordance with some embodiments of the invention. It should be understood that the MSBD 300 can be implemented through communication between nodes 302ii, 302iv, 302v, (shown as examples in this FIG., but it should be understood that any, some or all nodes have this functionality) or direct communication between the nodes and a processing hub 106. Data may further be stored on nodes for use at a later point.

Inter-nodal bidirectional communication can happen via, but is not limited to, optical, radio and/or laser communication. Bidirectional data communication can consist of, but is not limited to, node identification, position, orientation, temporal, error data, calibration data, other node type data, MSBD reference data, future node (nodes that will join the MSBD in the future) reference data, planetary data, ground processing data, celestial data, and/or data from space entities external to the MSBD.

In some embodiments of the invention, at least one of the tessellated moving space based datum planes in the MSBD system 100 can be implemented actively, meaning that the MSBD itself can have data travel over it, to and from each satellite/space based node.

Figure 8:
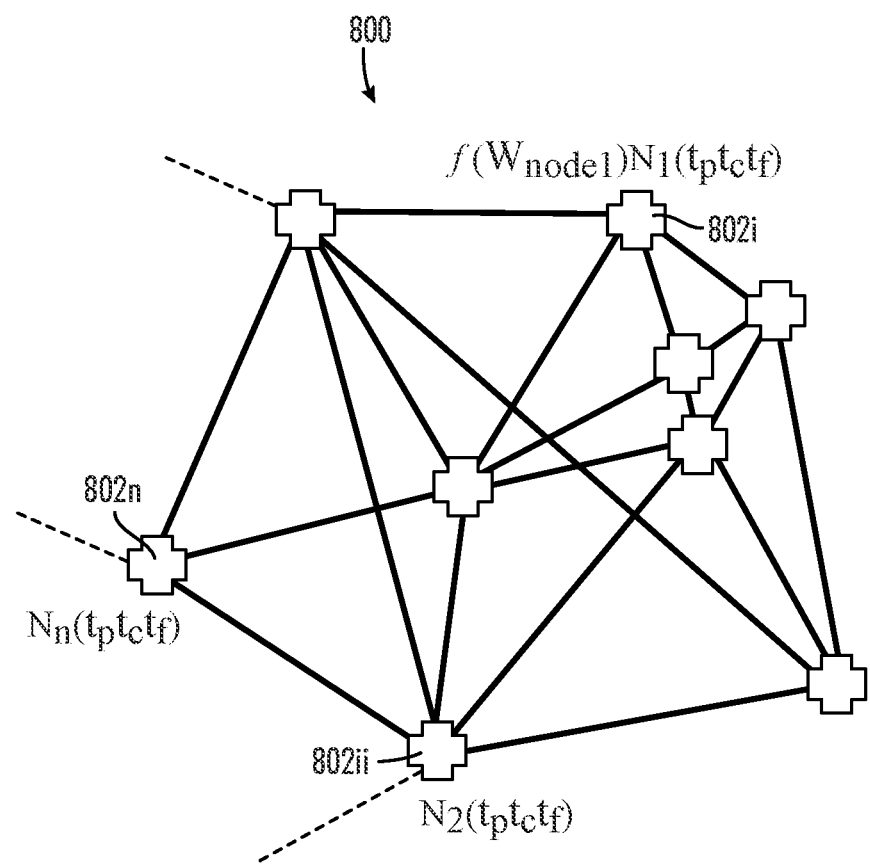
FIG. 8 is a schematic diagram showing temporal weighting of nodes for optimizing the MSBD system, in accordance with some embodiments of the invention.

FIG. 8 is a schematic diagram showing temporal weighting of weighted nodes 802i, 802ii, 802n for optimizing an MSBD 800 in the MSBD system 100, in accordance with some embodiments of the invention. In an embodiment of the invention, the MSBD 800 may be weighted in performance calculations and modeling. These performance calculations and modeling are based on its quality of solution over time. This quality may vary and will define a temporal weighting $f(W_{node\ n})$, specific to its unique node solution of position and orientation (i.e. the quality and weighting are node specific). These weights are utilized to optimize the mesh MSBD 800 as well as the performance of nodes 802i, 802ii, 802n or subsets of nodes across the mesh.

Not all satellites are designed for or require the finest degrees of positional and rotational accuracy and stability. Small, cube or micro vehicles may minimize PNT systems in favor of weight and cost savings. As such, nodes in the MSBD will have different degrees of native PNT performance. Their accuracies will in turn be weighted appropriately in mesh surface calculation. This feature of the weighting of the MSBD is a key feature in low-cost satellite deployment as "PNT as a service" is now further enhanced. Weight calculations are a variable in time, and may vary instantaneously or may have a slow time rate of change in performance due to equipment age or space conditions, in some embodiments of the invention.

Figure 9:
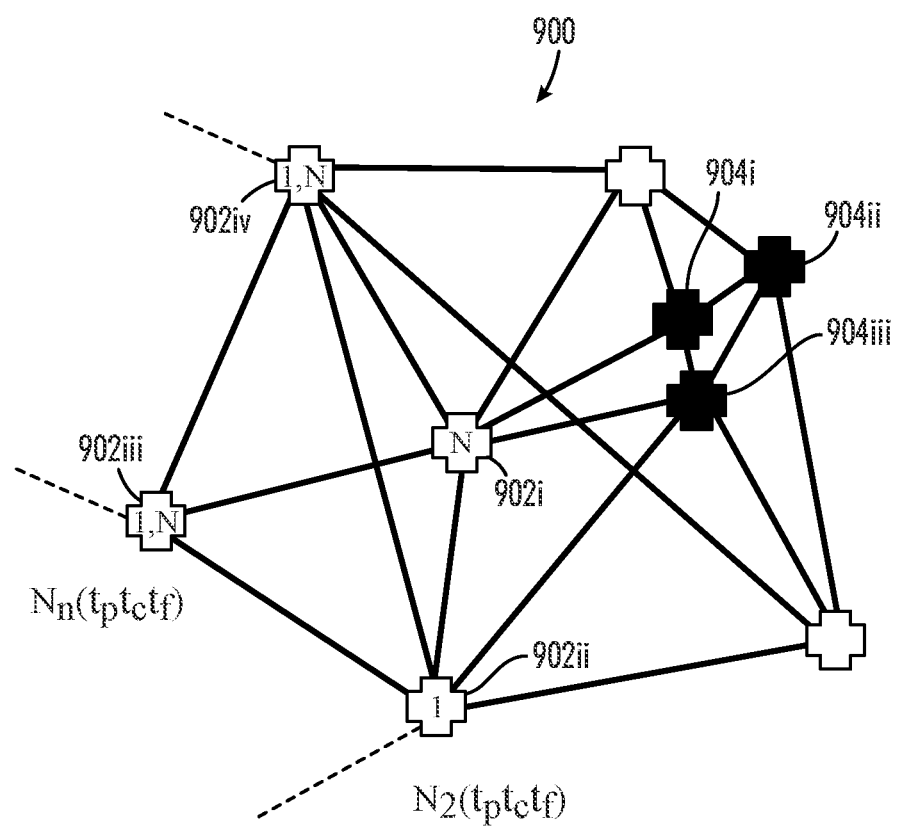
FIG. 9 is a schematic diagram showing the creation of subsets of nodes within the MSBD system, in accordance with some embodiments of the invention.

FIG. 9 is a schematic diagram showing the creation of subsets of nodes (for example, node subsets 1, N and 1,N) within an MSBD 900 of the MSBD system 100, in accordance with some embodiments of the invention. In an embodiment of the invention, multiple MSBDs can be configured within, stacked, adjacent or dispersed, effectuating additional positioning and orientation capabilities such as the relative position of one MSBD to another, both internal and external to the meshed network of nodes.

In some embodiments of the invention, nodes may be chosen to work across the full mesh or may be considered for local use, as a subset within it. Nodes and their weights may be modified as a subset, locally or as a full set across the MSBD 900. Node weighting can be used to optimize a solution based on use case.

The MSBD 900 can be implemented with one tessellated plane or with many tessellated planes. As an example (but not limited to): two MSBD planes or layers are created (MSBD surface 1 and MSBD surface N) of three nodes each, 902ii, 902iii, and 902iv for surface 1 and 902i, 902iii, 902iv for surface N, produced by connecting 4 different nodes in different configurations. This however is only a single example case as there are a vast number for combinations and permutations of node connections possible, forming n planes or surfaces across the MSBD 900 or any MSBD present or possible in the MSBD system 100.

These planes/surfaces and their entropy, individually and plane to plane, will act as added calculation sets for overall, local, and individual node performance, providing additional data points for MSBD system 100 operations. The multiple individual planes within the MSBD can be stacked, adjacent or dispersed within the larger collection of MSBDs in the MSBD system 100. Node groups may be formed for specific tasks, for example, maximizing a certain accuracy, maximizing temporal lag, and/or minimizing connectivity loss.

FIG. 9 also demonstrates that there can exist local only nodes 904i, 904ii, 904iii within the MSBD 900.

Figure 10:
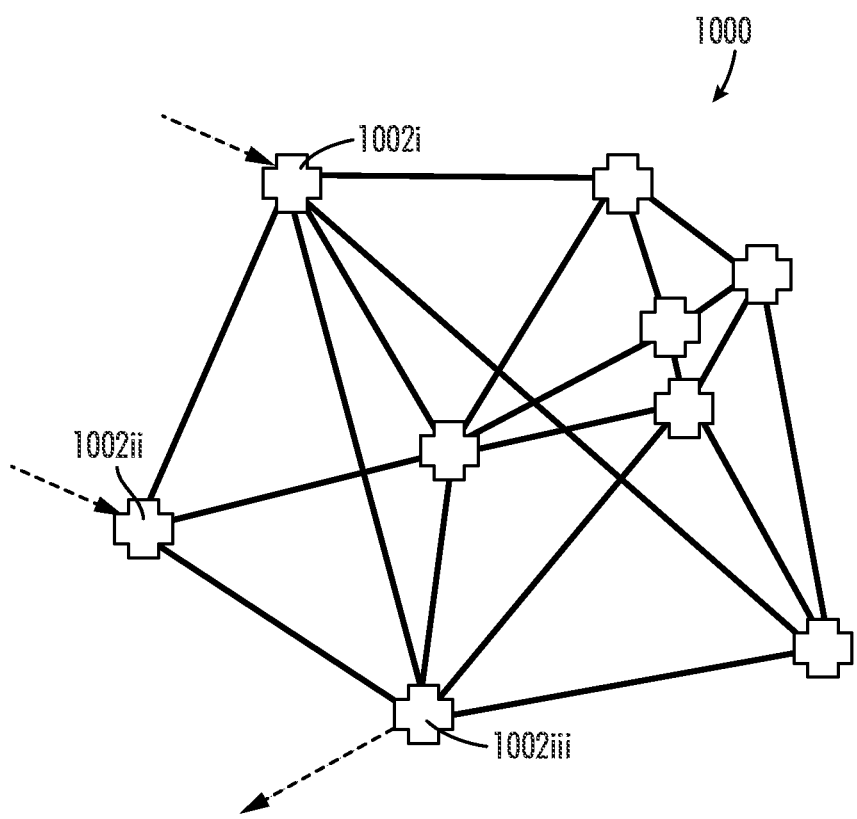
FIG. 10 is a schematic diagram showing the addition and/or subtraction of nodes in the MSBD system over time, in accordance with some embodiments of the invention.

FIG. 10 is a schematic diagram showing the addition and/or subtraction of nodes in an MSBD 1000 of the MSBD system 100 over time, in accordance with some embodiments of the invention. That is, nodes making up the MSBD 1000 can change, resulting in an MSBD configuration and/or implementation which is static or dynamic. FIG. 10 shows via dashed lines, nodes that may enter (nodes 1002i, 1002ii) and exit (1002iii) the MSBD 1000 temporally. Actual and simulated nodes may enter and exit the MSBD. Nodes may continue to capture positional information for use by the MSBD system 100, while connected or disconnected from the network. In an embodiment of the invention, this information enhances their internal performance from previous mesh connection as well as planned future reintegration into the mesh.

In some embodiments of the invention, these enhancements improve the performance of each node throughout its operational tasks as errors associated with their internal performance of systems can be corrected and removed. They may have their position orientation data calculated from past, current or future predicted positions. Nodes may enter the MSBD 1000 for the purpose of MSBD mesh performance enhancement, or simply accuracy enhancement of their own or a group of nodes (a "subset" such as described with respect to FIG. 9).

Figure 11:
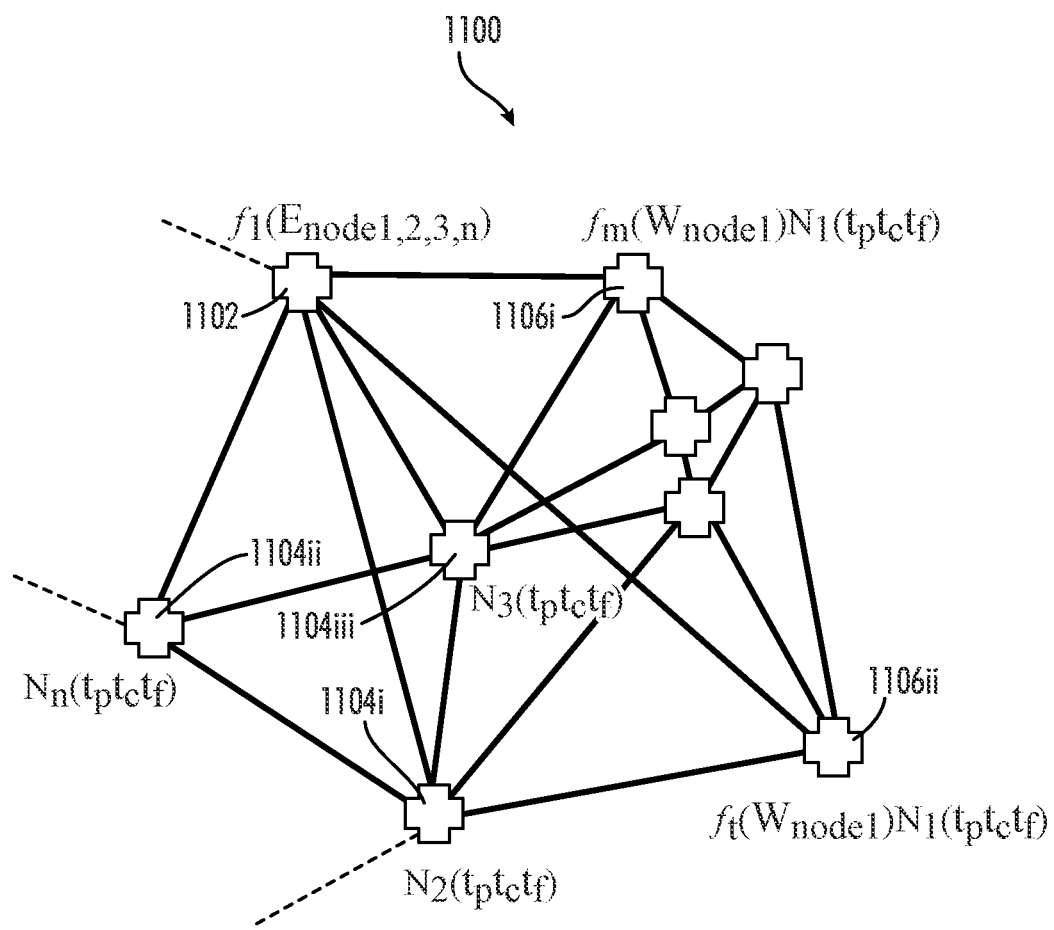
FIG. 11 is a schematic diagram showing an error correction function of the MSBD system, in accordance with some embodiments of the invention.

FIG. 11 is a schematic diagram showing an error correction function in an MSBD 1100 of the MSBD system 100, in accordance with some embodiments of the invention. As can be gleaned from the description of the invention herein, the number of nodes in the MSBD system 100 affects system error, accuracy and/or knowledge ascertained by the MSBD system. Generally, more nodes leads to better information, whereas less nodes is relatively not as good. Temporal weighting of nodes is described elsewhere herein, however, it should be understood that in some embodiments of the invention each node calculates its weighted Temporal=t (Past=p, Current=c, Future=f) position orientation $f_{m,t,l}$ ($W_{node\ n}$) $N_n$ ($t_p$ $t_c$ $t_f$), where each node in turn acts as a reference location for all other nodes in the meshed network 1100. This weighting and/or referencing drives an error function $f(E_{node\ 1-n})$ which may be applied to each node based on the number of connected reference nodes, in some embodiments of the invention.

As described elsewhere herein, this weighting and/or referencing may be MSBD wide (full mesh=m), surface plane only (one tessellation=t), or across an alternative local schema of nodes (local=l) as represented by $f_m(E_{node\ 1-n})$ and/or $f_t(E_{node\ 1-n})$ and/or $f_l(E_{node\ 1-n})$. This provides a non-correlated error function for correction of position orientation. FIG. 11 shows an embodiment of what can be an error calculation performance enhancement of one to many nodes, where there is at least one error corrected node 1102 (in a schema) and non-schema reference nodes 1104i, 1104ii, 1104iii and schemed nodes 1106i, 1106ii.

In some embodiments of the invention, an MSBD in the MSBD system 100 can be implemented mathematically with full or partial simulated nodes in an MSBD plane. For example, the MSBD can be implemented mathematically using knowledge gathered from three space-based nodes. Those three nodes, for example, can be three locations for a single space-based entity over the course of time, including any combination of a node's past, present or future locations, and/or can include simulated nodes. In some embodiments of the invention, a simulated node is an identifiable point or location in space used in the calculation of an MSBD.

Figure 12:
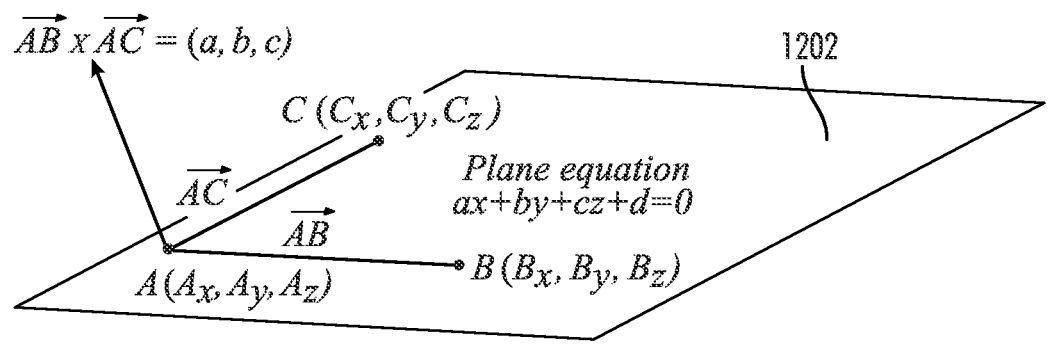
FIG. 12 is a schematic diagram illustrating reference math of the MSBD system, in accordance with some embodiments of the invention.

FIG. 12 is a schematic diagram illustrating exemplary reference math for plane calculation in the MSBD system 100, in accordance with some embodiments of the invention. As described elsewhere herein, three nodes (A, B, C) in space can be used to form an MSBD plane utilizing the following:

Plane equation $ax+by+cz+d=0$ $\vec{AB}=(B_x-A_x, B_y-A_y, B_z-A_z)$ $\vec{AC}=(C_x-A_x, C_y-A_y, C_z-A_z)$ (1)

$\vec{AB} \times \vec{AC}(a,b,c)$ $a = (B_y - A_y)(C_z - A_z) - (C_y - A_y)(B_z - A_z)$ $b = (B_z - A_z)(C_x - A_x) - (C_z - A_z)(B_x - A_x)$ $c = (B_x - A_x)(C_y - A_y) - (C_x - A_x)(B_y - A_y)$ $d = -(aA_x + bA_y + cA_z)$ (2)

Figure 13:
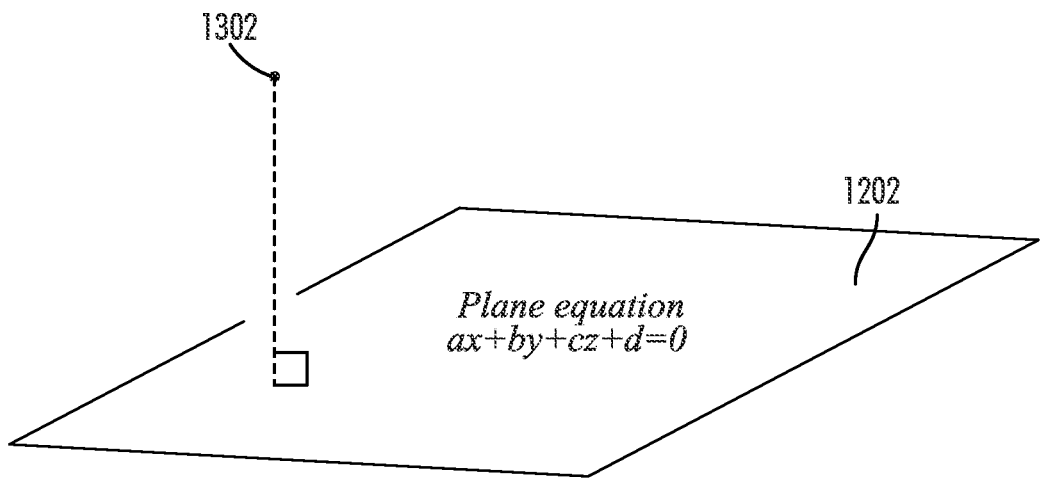
FIG. 13 is a schematic diagram illustrating a use of the MSBD system to determine distance or location of point, in accordance with some embodiments of the invention; and, FIG. 14 is a flowchart of a method of using a MSBD system, in accordance with some embodiments of the invention.

FIG. 13 is a schematic diagram illustrating a use of the MSBD system 100 to determine distance or location of a point 1302 over an MSBD plane 1202, in accordance with some embodiments of the invention. In some embodiments of the invention, the equation for the MSBD plane 1202, (ax+by+cz+d=0), and the distance, (L), to point 1302 is used to determine the point's location (xo,yo,zo).

$L\sqrt{a^2+b^2+c^2} = |ax_0 + by_0 + cz_0 + d|$

In some embodiments, the equation for the MSBD plane 1202, (ax+by+cz+d=0), and point location, (xo,yo,zo), are used to determine distance, (L), from the plane 1202 to the point 1302.

$$L = \frac{|ax_0 + by_0 + cz_0 + d|}{\sqrt{a^2 + b^2 + c^2}}$$

Figure 14:
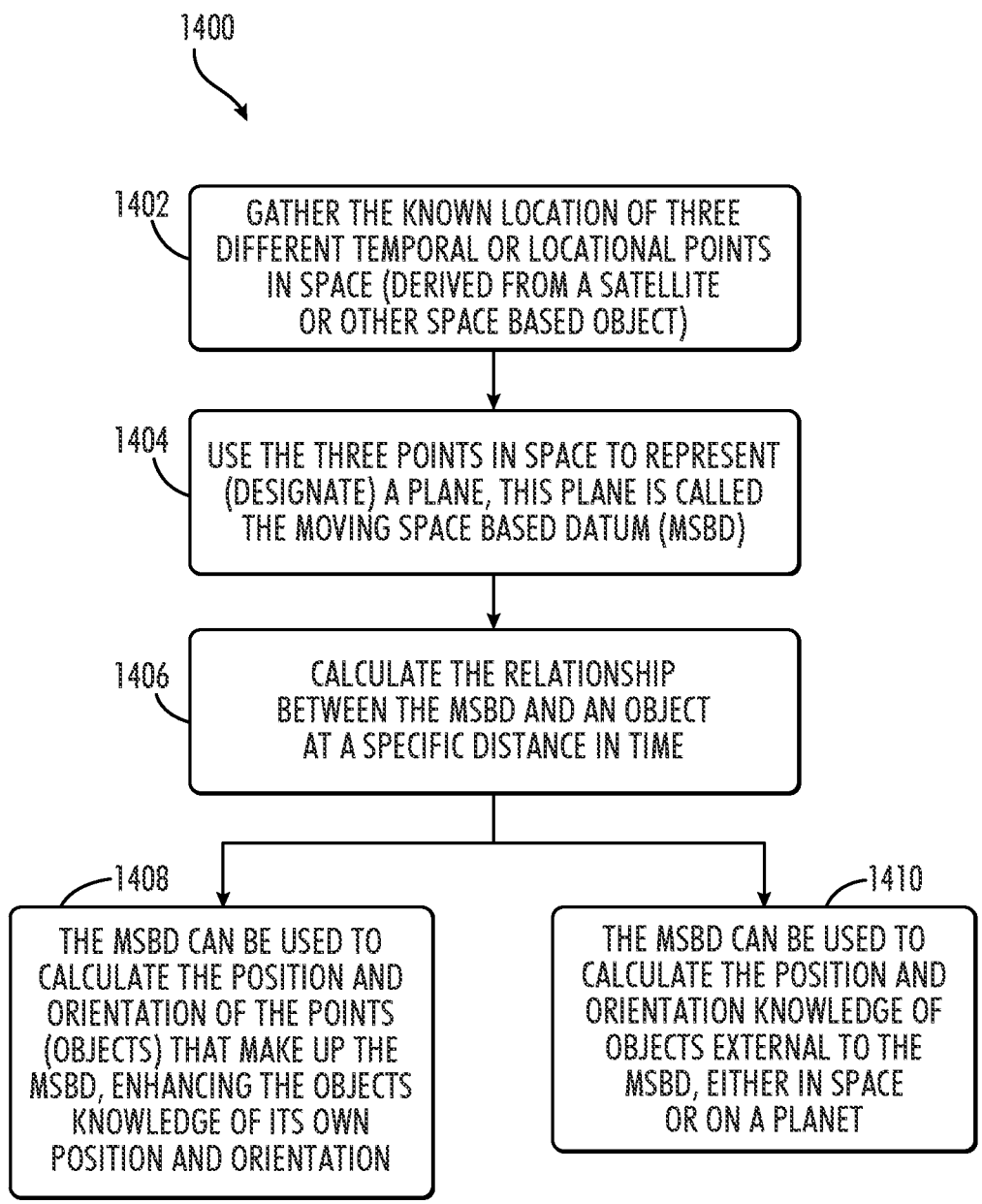

FIG. 14 is a flowchart 1400 of a method of using a MSBD system 100, in accordance with some embodiments of the invention. In an embodiment of the invention, a known location of three different temporal or locational points in space (derived from a satellite or other space based object) is gathered (1402). An MSBD plane (such as MSBD 300) is designated (1404) using the three points in space whose information is known to calculate the plane. In an embodiment of the invention, the relationship between the MSBD and an object at a specific instance in time is calculated (1406).

Subsequently, the MSBD is used to calculate (1408) the position and orientation of at least one node (object) that makes up the MSBD, enhancing the node's knowledge of its own position and orientation. Additionally, alternatively and/or optionally, the MSBD is used to calculate (1410) the position and orientation knowledge of at least one object external to the MSBD, either in space or on a ground surface.

It is expected that during the life of a patent maturing from this application many relevant MSBDs will be developed and the scope of the term MSBD is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The term "plurality" means "two or more".

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system of nodes that form a moving space based datum (MSBD) which designates at least one dynamic data reference surface, wherein the nodes comprise physical and independently controlled satellites and other space based entities.

2. The MSBD according to claim 1, formed from a plurality of layers.

3. A method of using the MSBD according to claim 1, comprising:
   gathering a known location of the plurality of nodes in space;
   forming a MSBD comprising a tessellated surface by using the plurality of nodes to designate at least one reference surface as the MSBD; and,
   calculating the relationship between the MSBD and an object at a specific distance in time.

4. The method according to claim 3, further comprising using the MSBD to calculate at least one of the position and orientation of at least one of the nodes that make up the MSBD.

5. The method according to claim 3, further comprising using the MSBD to calculate at least one of the position and orientation of the object, wherein the object is external to the MSBD.

6. The method according to claim 3, further comprising using the MSBD to ascertain at least one of ground and planetary position of the object.

7. The method according to claim 3, further comprising calculating at least one of position and orientation of a passing object.

8. The method according to claim 3, wherein the plurality of nodes are made up of at least one of a temporal point and a physical point.

9. The method according to claim 3, further comprising communicating data between the plurality of nodes.

10. The method according to claim 3, further comprising communicating data between one or more of the plurality of nodes and at least one ground station.

11. The method according to claim 3, further comprising weighting at least one of the nodes for at least one of performance calculations and modeling.

12. The method according to claim 11, wherein the weighting is temporal weighting.

13. The method according to claim 3, further comprising a creating a plurality of subsets of nodes.

14. The method according to claim 3, wherein individual nodes that comprise the MSBD change over time.

15. The method according to claim 3, further comprising correcting error related to a node of the MSBD by sharing at least one of position data and orientation data amongst the plurality of nodes of the MSBD.

16. The method according to claim 3, wherein a node is selected from a weather satellite, a space telescope, an imaging satellite, a communications satellite, the international space station or other space based entity.

17. The method according to claim 3, wherein designation of a MSBD is independent of the type of nodes used.

18. The method according to claim 3, wherein the MSBD is designated using calculations based on at least one of past, present and future predicted node locations.

19. The method according to claim 3, wherein at least one of the nodes is at least partially simulated.

20. The method according to claim 3, wherein the tessellated surface is formed from nodes in a plurality of layers.

21. A method of ascertaining a geolocation of at least one point on a ground, comprising:
    connecting an MSBD according to claim 1 to a ground station in a known geolocation, to establish a referenced relationship between the MSBD and the known geolocation; and,
    connecting at least one of the nodes of the MSBD to the at least one point on the ground, the geolocation of the at least one point to be determined; and,
    calculating the geolocation of the at least one point on the ground using the referenced relationship.

22. The method according to claim 21, wherein connecting the nodes within the MSBD is performed continually or temporally.

23. A method of ascertaining a geolocation of at least one point on a ground, comprising:
    gathering position data from at least three nodes of the MSBD according to claim 1 to acquire a tessellated surface reference position in space;
    associating at least one of surface placement and position accuracy to the at least one node of the MSBD;
    translating the tessellated surface reference position to the at least one point on the ground; and,
    determining a geolocation of the at least one point by triangulation using the at least three nodes of the MSBD.

* * * * *